United States Patent
Barzegar et al.

(10) Patent No.: US 7,940,750 B2
(45) Date of Patent: *May 10, 2011

(54) ELECTRONIC LOOP PROVISIONING

(75) Inventors: Farhad Barzegar, Branchburg, NJ (US);
Irwin Gerszberg, Kendall Park, NJ (US); Thomas W. Hill, Jr., Succasunna, NJ (US); Scott Joseph Mollica, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/501,927

(22) Filed: Jul. 13, 2009

(65) Prior Publication Data
US 2009/0274147 A1 Nov. 5, 2009

Related U.S. Application Data

(63) Continuation of application No. 10/248,320, filed on Jan. 8, 2003, now Pat. No. 7,564,833.

(51) Int. Cl.
*H04L 12/66* (2006.01)
*H04L 12/28* (2006.01)
*H04L 12/56* (2006.01)

(52) U.S. Cl. ........ 370/352; 370/354; 370/389; 370/392; 370/395.31; 370/399

(58) Field of Classification Search .......... 370/352–356, 370/389, 392, 401, 466, 467
See application file for complete search history.

(56) References Cited

U.S. PATENT DOCUMENTS

| 5,673,255 | A | * | 9/1997 | Dunn et al. | 370/244 |
| 6,047,061 | A | * | 4/2000 | Cornes et al. | 379/333 |
| 6,069,890 | A | * | 5/2000 | White et al. | 370/352 |
| 6,122,255 | A | * | 9/2000 | Bartholomew et al. | 370/237 |
| 6,957,258 | B2 | * | 10/2005 | Maher et al. | 709/224 |
| 7,099,443 | B2 | * | 8/2006 | Phillips et al. | 379/93.05 |
| 7,394,897 | B1 | * | 7/2008 | Bedingfield et al. | 379/221.02 |
| 2002/0168054 | A1 | * | 11/2002 | Klos et al. | 379/1.04 |
| 2003/0078962 | A1 | * | 4/2003 | Fabbricatore et al. | 709/203 |
| 2003/0118170 | A1 | * | 6/2003 | Wilson | 379/220.01 |
| 2003/0142664 | A1 | * | 7/2003 | Gerszberg et al. | 370/354 |
| 2005/0074021 | A1 | * | 4/2005 | Bossemeyer et al. | 370/420 |
| 2005/0147107 | A1 | * | 7/2005 | Powers et al. | 370/397 |

* cited by examiner

*Primary Examiner* — Chi H Pham
*Assistant Examiner* — Farah Faroul

(57) ABSTRACT

The present invention is directed to a local network access architecture and method of providing local services that advantageously replaces portions of the physical hardwired local loop with a path that is software-defined. In one embodiment the system comprises a remote terminal comprising a packet processor that converts an analog signal carried on a customer loop into digital packets and a packet node connected to the remote terminal configured to selectively forward the digital packets based on an identifier in the digital packets to equipment of one of a plurality of local exchange carriers, wherein said plurality of local exchange carriers are different companies and each one of said plurality of local exchange carriers provides at least one different service subscribed to by a subscriber.

20 Claims, 6 Drawing Sheets

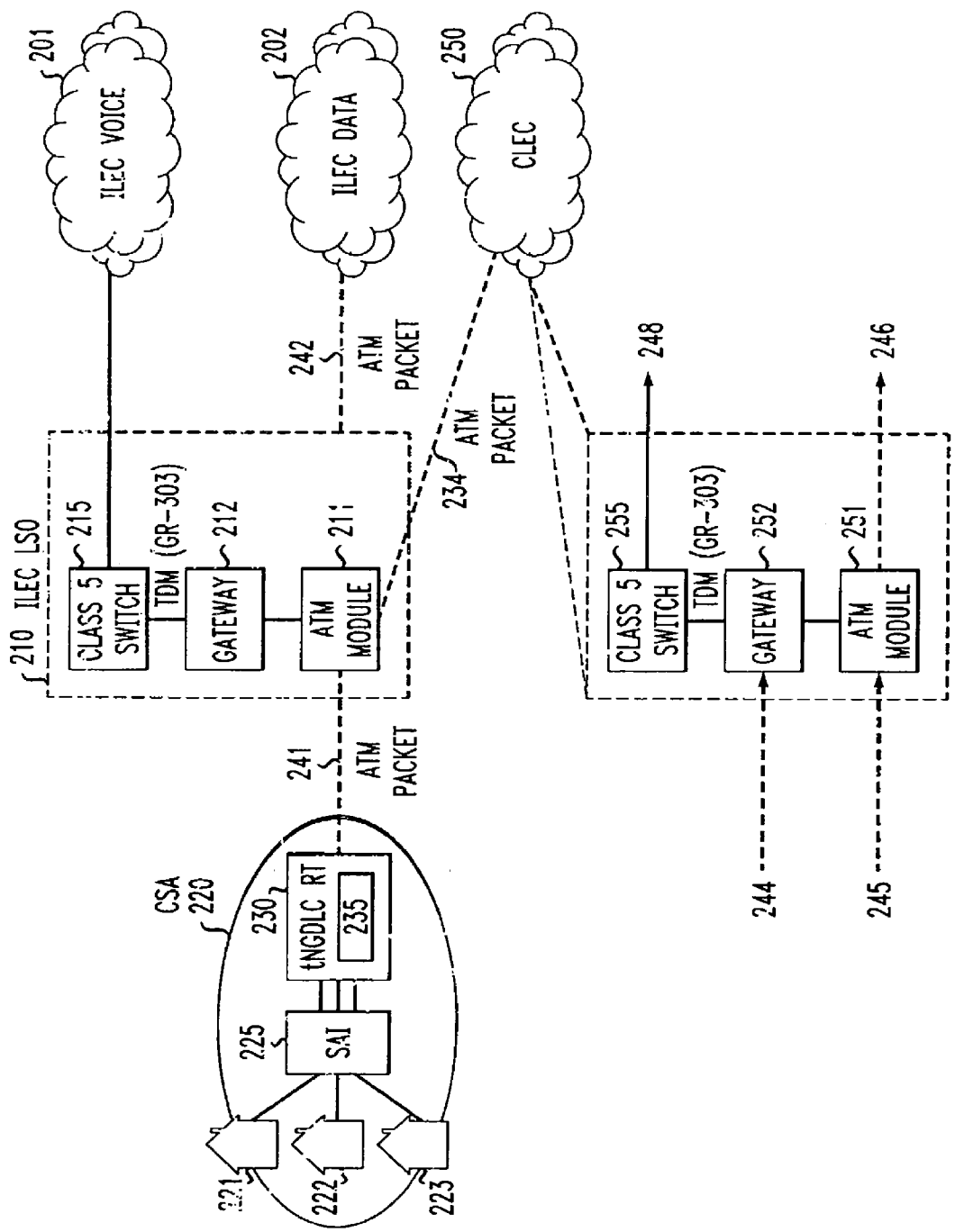

*FIG. 3*
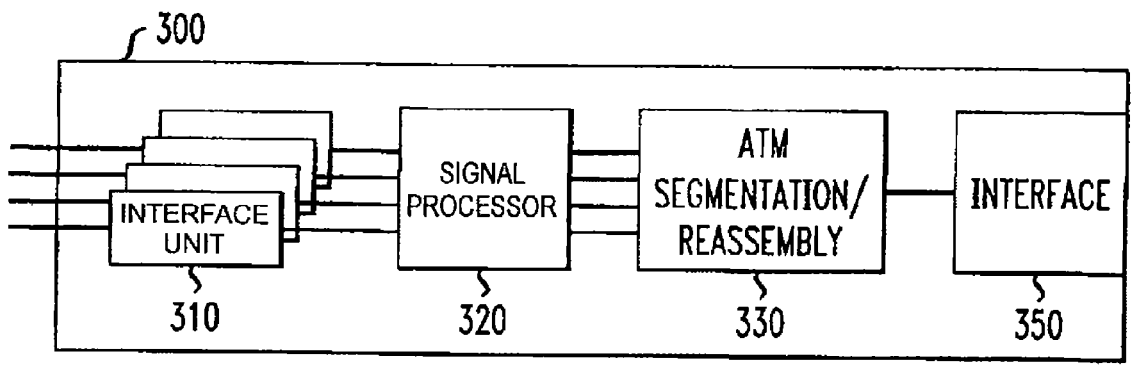
*FIG. 4*
*FIG. 5*
| INPUT | | OUTPUT | |
|---|---|---|---|
| PORT | IDENTIFIER | PORT | IDENTIFIER |
| CSA1 | SUBSCRIBER1 | ILEC1 | SUBSCRIBER1' |
| CSA1 | SUBSCRIBER2 | CLEC1 | SUBSCRIBER2' |
| ILEC1 | SUBSCRIBER1' | CSA1 | SUBSCIBER1 |
| CLEC1 | SUBSCRIBER2' | CSA1 | SUBSCRIBER2 |

ELECTRONIC LOOP PROVISIONING

CROSS REFERENCE TO RELATED APPLICATIONS

This application is a continuation of U.S. Ser. No. 10/248,320, filed Jan. 8, 2003, now U.S. Pat. No. 7,564,833, which is herein incorporated by reference.

BACKGROUND OF INVENTION

The present invention relates to local access network architectures and, more particularly, for supporting competition among local exchange carriers.

FIG. 1 is an abstract diagram of the current local access architecture for telephony and other local services such as ISDN or digital subscriber line service. In FIG. 1, a plurality of telephony subscribers at customer premises 116, 117, 118, 126, 127, 128, 136, 137, 138 in customer serving areas (CSA) 101, 102, 103 are provided with local exchange service by an incumbent local exchange carrier (ILEC). The ILEC maintains a plurality of local serving offices (LSO) 110, 120, 130 which connects to the customer premises in basically three known ways: (1) using conventional copper wires 135 connected directly to a switch 133 in the central office 130 via a serving area interface (SAI) 134; (2) using a legacy universal digital loop carrier (UDLC) system to multiplex encoded digital channels of the customer signals from a remote terminal (RT) 123 to a central office terminal (COT) 122 next to the switch 121 in the central office (120) via a SAI 124; or (3) using the more advanced integrated digital loop carrier (IDLC) 113 system to multiplex customer signals to the switch 111 in the central office 110 via a SAI 114. These digital loop carrier systems improve the economics of loop development by using telephone line cards at each remote terminal that convert the analog signal from a copper loop into 64 kb/s encoded digital signals. The digital channels are multiplexed, using time division multiplexing (TDM), on an optical transport (e.g. OC-1, OC-3 SONET) between the remote terminal and the central office, in accordance with Telcordia GR-008 125 or GR-303 115 interface standards. The central offices 110, 120, 130 also typically connect to each other using optical links—as well as with the rest of the ILEC network 100.

Federal legislation and regulations have recently mandated that ILECs provide other entities, referred to as competitive local exchange carriers (CLECs), with "unbundled" access to the local access infrastructure in order to provide competitive local services. Where a CLEC desires to connect to the unbundled local loop of a subscriber, this presents numerous challenges, as illustrated in FIG. 1A. Where the subscriber loop 135 is directly connected to the LSO switch 133, this necessitates what is referred to in the art as a "coordinated hot cut", represented as a box 132 labeled XC. The copper wire pair is manually transferred by a technician, at the Metallic Distribution frame and re-routed from the central office switch 133 and connected to equipment, e.g. 153, 163, co-located by the CLEC 150, 160 at the central office 130. Each CLEC 150, 160 must co-locate their own equipment at each central office 110, 120, 130 in order to provide local services to each unbundled local subscriber in the respective customer serving areas 101, 102, 103. This transfer of the subscriber loop is coordinated with a request, through the Local Number Portability process, to port the subscriber's telephone number to the CLEC's Class 5 switch. Moreover, if a customer desires to switch local exchange carriers, this requires another expensive manual "hot cut" transferring the copper loop to another LEC's equipment at the central office. The current digital loop transmission systems further complicate this expensive, time-consuming and error-prone process, requiring specialized interfaces to ILEC central office equipment.

Accordingly, there is a need to provide a local access architecture that reduces the costs of provisioning local services for subscribers and permits competitive local exchange carrier services without requiring manual local loop transfers.

SUMMARY OF INVENTION

The present invention replaces portions of the physical hardwired local loop with a path that is software-defined. In accordance with an aspect of the invention, remote terminals are deployed which further comprise packet processors which digitize and packetize the analog signals of customer loops into digital packets. The digital packets are forwarded to packet nodes which can be configured and reconfigured to connect packet streams to the equipment of different local exchange carriers. A gateway can be provided at each local exchange carrier to convert the packet streams into a format compatible with a legacy central office switch, e.g. time division multiplexed telephony signals. A customer loop can be readily migrated to a different local exchange carrier or a different local service through reconfiguration of the packet node. In accordance with another aspect of the invention, the remote terminals can feed the digital packets to a high-speed packet network which routes the packets among the central offices and a point-of-interface office. A competitive local exchange carrier need only connect to the point-of-interface node of the packet network in order to provide local services to any customer loop connected to the packet network.

The present invention advantageously permits a subscriber's local loop to be provisioned for different services and for different local exchange carriers merely by reconfiguring a packet node in the packet network. A digital loop transmission system based on the present invention can take advantage of packet aggregation and be shared among all of the local exchange carriers in a manner that does not require each local exchange carrier to deploy and co-locate duplicative digital loop carrier systems at every central office.

These and other advantages of the invention will be apparent to those of ordinary skill in the art by reference to the following detailed description and the accompanying drawings.

BRIEF DESCRIPTION OF DRAWINGS

FIG. 2 is a diagram of a local access network, configured in accordance with an embodiment of an aspect of the present invention.

FIG. 3 is an abstract diagram of the components of a line card for a remote terminal, in accordance with an embodiment of another aspect of the present invention.

FIG. 4 is an abstract diagram of an illustrative packet.

FIG. 5 is a simplified illustration of a packet forwarding table for a packet node in the local access network illustrated in FIG. 2.

DETAILED DESCRIPTION

Figure 1:
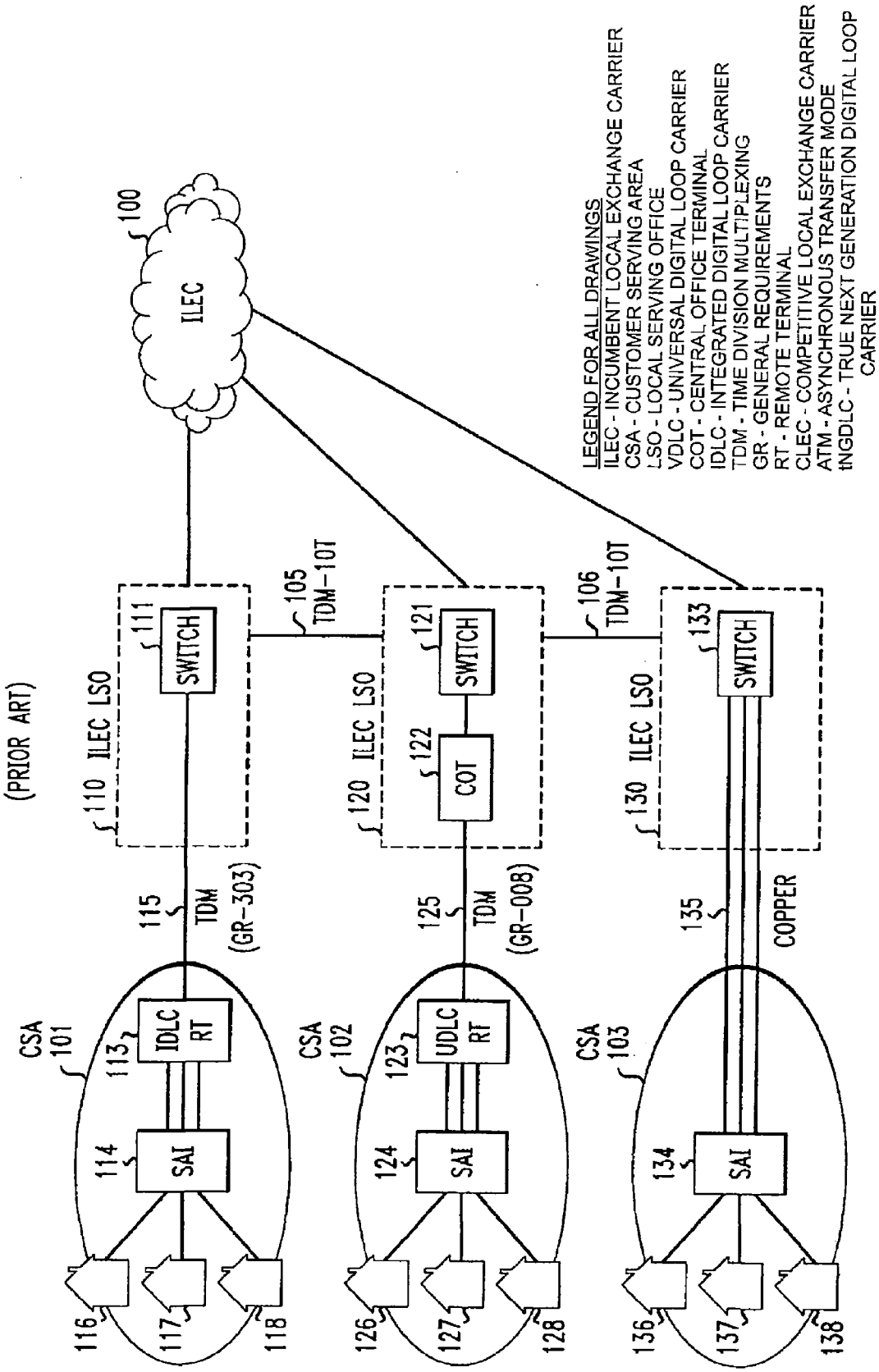
FIGS. 1 and 1A illustrate a prior art local access architecture.
Figure 1A:
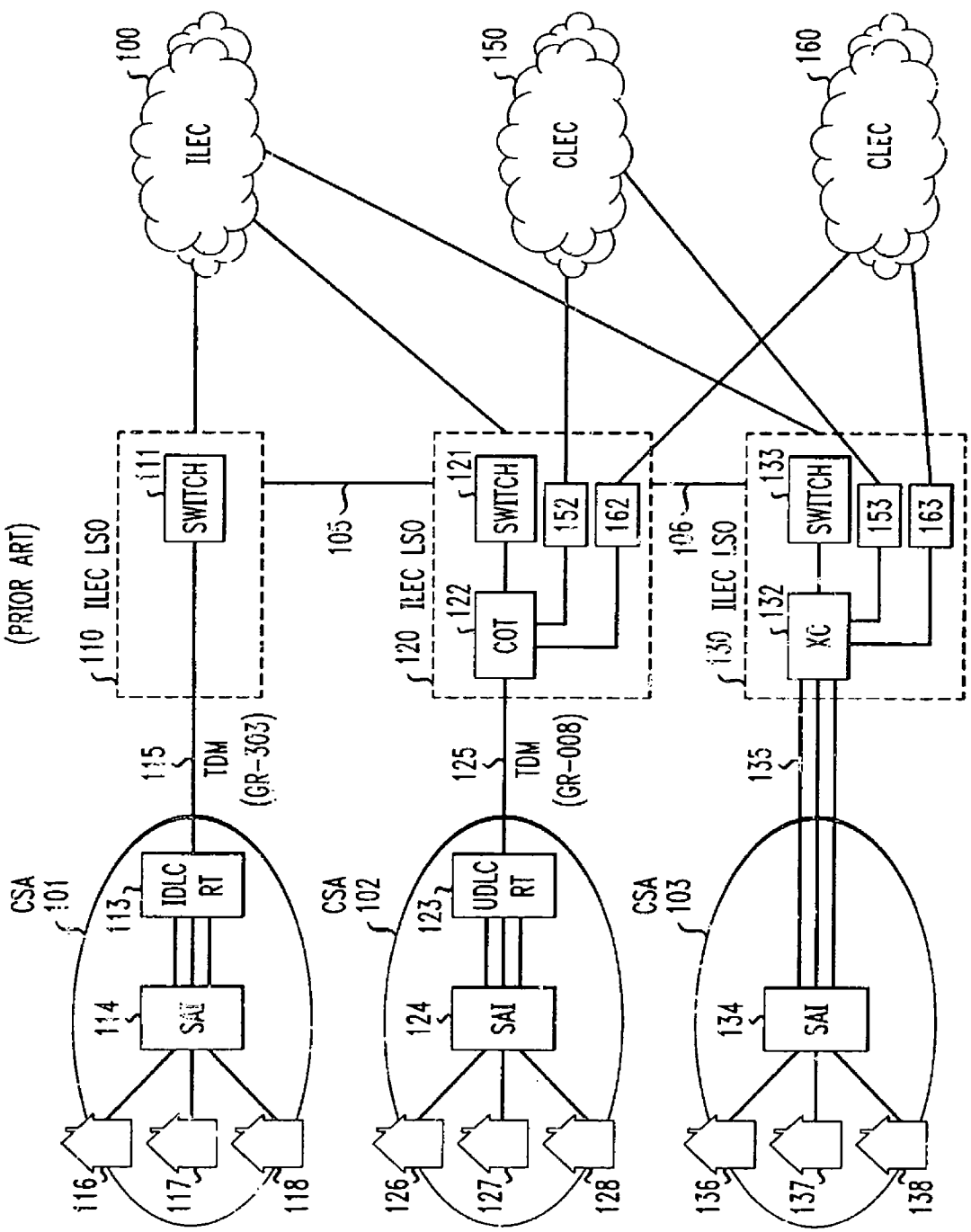

FIG. 2 is an abstract diagram of a local access network, configured in accordance with an embodiment of the present invention. In FIG. 2, a plurality of subscribers at customer premises 221,222, ... 223 in a customer serving area (CSA) 220 are provided with local exchange service by an incumbent local exchange carrier (ILEC). The ILEC, as in the prior art, maintains a local serving office (LSO) 210 which connects to the customer premises 221,222, ... 223 using conventional copper loops, typically through one or more serving area interfaces (SAI) 225, as illustrated in FIG. 2. Unlike the prior art, however, the ILEC uses a different architecture to replace the prior art digital loop transmission system. The ILEC, as shown in FIG. 2, deploys specialized remote terminal (RT) 230, referred to by the inventors as a "true next generation digital loop carrier" (tNGDLC) remote terminal, the design and operation of which is further described herein below. The tNGDLC remote terminal 230, in accordance with an embodiment of an aspect of the invention, comprises some form of voice packet processor (VPP) 235 that is responsible for translating the analog signals off of the tip/ring interface of the copper loops into digital packets.

The present invention is not limited to a particular packet format or packet protocol. The present invention shall be described herein, for illustrative purposes, with reference to Asynchronous Transfer Mode (ATM) packets/cells. See, e.g., ATM Forum, af-vmoa-0145, af-uni-0010, af-tm-0121, etc., www.atmforum.com; International Telecommunication Union, ITU-T Recommendations, I.361, I.362, I.363, I.364, etc. Nevertheless, one of ordinary skill the art would readily recognize that the principles of the present invention could be extended to other packet formats and protocols—such as those defined in the multi-protocol label switching (MPLS) architecture. See, e.g., E. Rosen et al., "Multiprotocol Label Switching Architecture," Internet Engineering Task Force, Request for Comments (RFC) 3031 (January 2001).

The packets are forwarded to the ILEC LSD 210 by the tNGDLC remote terminal 230 through some advantageous transport medium 241, e.g., the tNGDLC remote terminal 230 can take advantage of existing optical transport mechanisms connecting prior art digital remote terminals and use the existing optical transceivers and fiber-optic transport facilities to exchange the digital packets with the ILEC LSO 210. At the central office 210, the ILEC maintains a packet node 211, illustratively an ATM module in FIG. 2, which is advantageously configured to forward the packets in accordance with the particular nature of the packet stream. For example, consider the situation where the ILEC provides conventional telephony services through a prior art Class 5 switch 215 at the central office 210, e.g. a Lucent 5ESS© switch. Packet flows associated with, an ILEC telephony subscriber are identified and forwarded by the packet node 211 to a packet voice gateway 212 which converts the packet streams into a format appropriate for the central office switch 215, e.g., into time division multiplexed (TDM) signals in accordance with known interface specifications such as Telcordia (formerly Bellcore) GR-303. See, e.g., Telcordia Technologies, Integrated Digital Loop Carrier General Requirements, Objectives and Interface. The local central office switch 215 then proceeds to handle the TDM telephony signals in accordance with the known art, e.g. by connecting the ILEC telephony subscriber through the ILEC voice network 201—and/or through an inter-exchange carrier—to another telephony subscriber.

It is important to note that since this architecture leverages the ILEC/CLEC investment of prior art Class 5 switching platforms, there is no impact of this approach on emergency, operator services or any other function performed by the Class 5 switch.

Where the ILEC provides data services to subscribers at customer premises 221,223, ... 223, the ILEC can have the packet node 211 forward such packet streams 242 directly to the ILEC's data network 202. Alternatively, where the ILEC provides access to data services to CLEC subscribers, the packet stream can be forwarded to the CLEC data network. In the latter scenario, the ILEC will provide CLEC access to the data packet stream through the same physical port that provides access to the telephony packet stream.

Where the ILEC is required to provide a competitive local exchange carrier (CLEC) with unbundled access to a particular subscriber, the ILEC may readily configure the packet node 211 to forward packets associated with the subscriber to the CLEC's network 250. The connectivity between the CLEC network 250 and the packet node 211 can be accomplished in a variety of ways. For example, this can be accomplished by having the CLEC co-locate a network element in the LSO 210 which receives packets from a port on the ILEC packet node 211. Alternatively, the packet node 211 can connect to a remote CLEC network element using an advantageous physical transport medium, e.g. optical fiber, without the need to collocate any equipment. Alternatively, and as further described below, the packet node 211 can connect to other packet nodes that form a local access network, any one of which can provide the required connectivity to the CLEC network 250. The third access alternative, described above, has the advantage that it performs a function similar to a telephony access tandem: a single ATM switch can aggregate the packet traffic (telephony and data packet streams) from many ILEC LSOs. At this Point-of-Interface, any CLEC can gain access to the local loops served in a plurality of wirecenters. Regardless of the particular physical architecture for providing connectivity to the CLEC network 250, the CLEC network 250 can then proceed to handle the subscriber's packet stream in accordance with the particular services being provided to the subscriber. Where the CLEC is providing conventional telephony services to the subscriber, the packet stream 244 can be forwarded in the CLEC network 250 to a packet voice gateway 252 which converts the packet streams into a format appropriate for a local exchange switch 255, e.g., TDM GR-303, which is maintained and utilized by the CLEC. Where the CLEC provides data services to the subscriber, the packet stream 245 can be forwarded to the CLEC's data network, e.g. through another packet node 251.

The present invention advantageously permits a subscriber's local loop to be provisioned for different services and for different local exchange carriers merely by reconfiguring the packet node 211. The ILEC's remote digital terminal 230 is shared among all of the local exchange carriers in a manner that does not require each local exchange carrier to deploy and co-locate duplicative digital loop carrier systems at every central office. The present invention substitutes packet aggregation for feature-group switching in the digital loop transmission system, thereby bypassing the expensive switching architecture in all cases except where required for handling the particular customer traffic.

A tNGDLC remote terminal 230, in accordance with an embodiment of an aspect of the invention, can be readily constructed using specialized line cards. The present invention, accordingly, may be incrementally deployed in a pre-existing digital loop carrier system by swapping existing line cards with these specialized line cards and possibly by installing an upgraded processor card to provide classification, queuing, and scheduling functions. FIG. 3 is an abstract diagram of the components of such a line card 300, in accordance with an embodiment of an aspect of the invention. An interface unit 310 connects to the analog tip/ring interface of the local copper loop of each subscriber. The interface unit 310 may need to be responsible for service-specific BORSCHT features, e.g. for providing battery, ring signaling and coding functions in the context of telephony services. The interface unit 310 forwards the digital signals to a signal processor 320. The signal processor 320 digitally transcodes the samples where advantageous into a compressed format (e.g., G.711, G.721, G.722, G.728, G.729, etc.) and provides echo cancellation facilities to remove echoes due to queuing, propagation and signal processing delays. The resulting digital signals are passed to a packet segmentation/reassembly component 330 which is responsible for taking the digital signals and creating packets in accordance with the relevant packet format and protocol. The packet stream from the line card 300 is multiplexed with packets to/from other subscriber linecards and finally has an interface 350 to the transport facilities of the remote terminal, e.g., typically an optical transceiver.

FIG. 4 is an abstract diagram of an illustrative packet. The packet has an identifier 410 in a packet header and carries the digitized signal from the local loop in its payload 420. The identifier 410 can be any information in the packet header that can be utilized by the packet node to decide which local exchange carrier to send the packet. For example, where the packet is an ATM cell, the identifier 410 can be a virtual circuit identifier, virtual path identifier (VCI/VPI). Alternatively, the packet identifier could be an MPLS label that designates a label switched path.

In this context, FIG. 5 illustrates a simplistic packet forwarding table for the ATM module 211 in FIG. 2. The ATM module 211 has ports to the carrier serving area, to the ILEC packet voice gateway, to the ILEC data network, and to the CLEC network-referred to respectively in FIG. 5 as ports "CSA1", "ILEC1", "ILEC2", and "CLEC1". Where the ATM module receives a packet at port "CSA 1" with an identifier associated with subscriber 1, the module is configured to forward the packet to port "ILEC1" with another identifier associated with subscriber 1. Where the ATM module receives packets at the "ILEC1" port with the identifier associated with the subscriber, it forwards the packets back to the "CSAL1" port with the identifier associated with subscriber 1. Thus, subscriber 1 is an ILEC telephony subscriber and packets to and from the subscriber are properly forwarded along the path to the ILEC's telephony gateway. On the other hand, the ATM module is configured to treat subscriber 2 as a subscriber to services by the CLEC. Where the ATM module receives a packet at port "CSA1" with an identifier associated with subscriber 2, the module is configured to forward the packet to port "CLEC1" with another identifier associated with subscriber 2. Where the ATM module receives packets at the "CLEC1" port with the identifier associated with the subscriber, it forwards the packets back to the "CSA1" port with the identifier associated with subscriber 2. Thus, packets to and from subscriber 2 are properly forwarded along a path to the CLEC network.

Where a provisioning change is desired, this can be readily accomplished by redefining the packet flow through the packet node. A subscriber may be readily switched from voice to data services or from the ILEC to a CLEC. For example, where the packet flow is defined by an ATM virtual circuit, the virtual circuit may be redefined, e.g., by changing the table shown, in FIG. 5. Subscriber 1, for example, may be switched to the CLEC by merely changing the subscriber 1 entries in the table to point to the CLEC port rather than the ILEC port of the ATM module. Or subscriber 1 may be switched to data services by changing the subscriber entries to point to the ILEC2 port rather than the ILEC1 port of the ATM module. Analogously, the above principles can be readily applied to any other connection-oriented packet flows. For example, the packet node can be a label switched router and the packet flow can consist of MPLS packets.

As mentioned above, the present invention does not necessitate that CLECs co-locate equipment at each and every central office. Rather, and in accordance with another aspect of the invention, each remote terminal at every carrier serving area can connect to a network of packet nodes that serves as the digital carrier loop transmission system. The CLECs can then advantageously connect to any designated point of interface to the digital carrier loop transmission system, as illustrated by the embodiments shown in FIG. 6 and FIG. 7.

Figure 6:
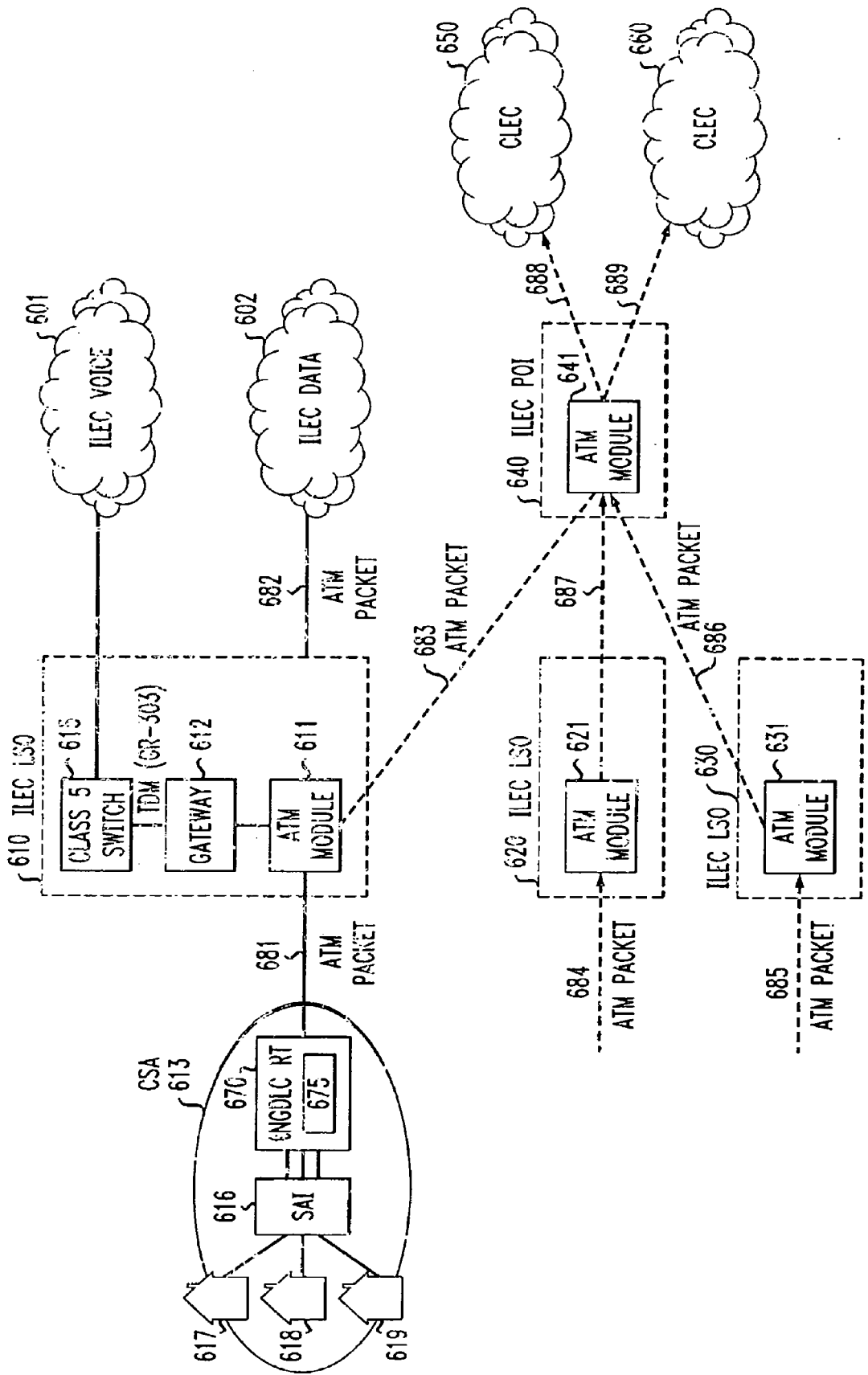
FIG. 6 is a diagram of a local access network, configured in accordance with another embodiment of the present invention.

FIG. 6 is a diagram of a local access architecture in accordance with an embodiment of this aspect of the invention. As in FIG. 2, a plurality of subscribers in FIG. 6, e.g., at customer premises 617, 618, . . . 619, in customer serving area (CSA) 613 are provided with local exchange service by an ILEC for voice 601 and for data 602 via packet interface 682. A SAI 616 connects to a plurality of tNGDLC remote terminals, e.g. 670 with voice packet processor 675, which connect through packet interfaces 681, 684, 685, to multiple local serving offices 610, 620, 630. Each local serving office 610, 620, 630 maintained by the ILEC has a packet module 611, 621, 631 connected to form a packet network. Local serving office 610 is illustrated as having a class 5 switch 615 and a gateway 612. The ILEC also maintains one or more point-of-interface offices 640, which can be co-located or separate from one of the central offices. At this location, a packet node 641 is maintained by the ILEC which connects to the rest of the packet network and provides a point-of-interface to CLECs who desire to gain access to the digital loop transmission system. Accordingly, suppose subscriber 617 has switched its local services to a CLEC, say the CLEC that maintains CLEC network 650. The tNGDLC remote terminal 670 packetizes the signal from the subscriber 617's local loop, which is forwarded from the carrier serving area 613 to the packet node 611 at the local serving office 610. The packet node 611 is configured to route CLEC packet streams through the connection 683 to the ILEC's point-of-interface office 640. A packet node 641 receives the packet stream and is configured to forward it to the appropriate CLEC, here through connection 688 to CLEC network 650 or through connection 689 to CLEC network 660. Regardless of which carrier serving area a subscriber is located, the packet streams can be forwarded by the packet network to the packet node 641 at the ILEC's point-of-interface 640. The CLEC need co-locate equipment, at most, at the point-of-interface office 640.

Figure 7:
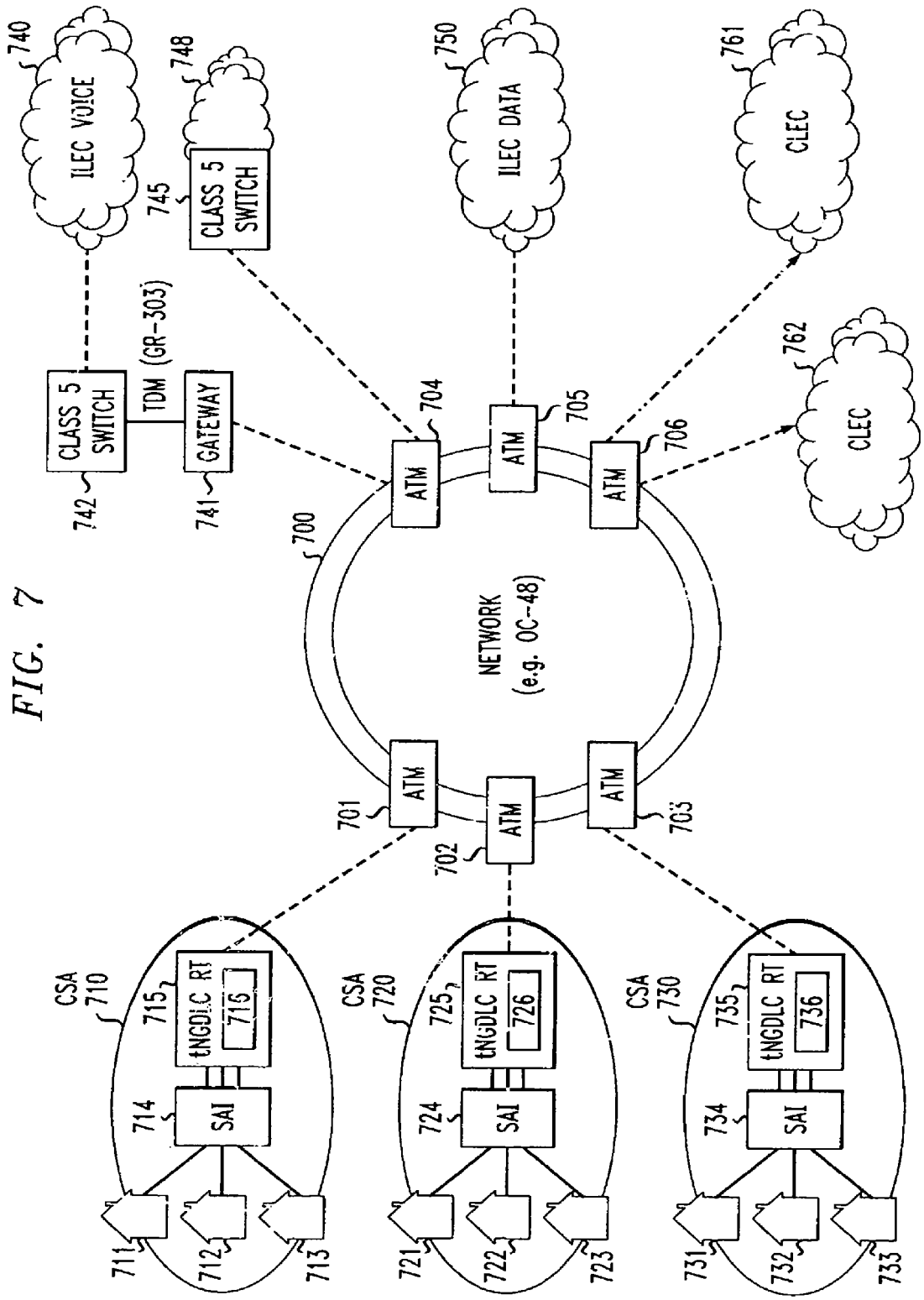
FIG. 7 is a diagram of a local access network, configured in accordance with another embodiment of the present invention.

FIG. 7 is a diagram of another embodiment of the local access architecture in accordance with this aspect of the invention. In FIG. 7, the packet network is represented by a high-speed optical network 700, e.g. an OC-48 SONET network. The nodes 701, 702, 703 in the packet network 700 are located in different central offices serving carrier serving areas 710, 720, 730 serving a plurality of subscribers at customer premises 711, 712, 713, 721, 722, 723, 731, 732, and 733, respectively. Each carrier serving area 710, 720, 730 has a SAI 714, 724, 734 connected to one or more tNGDLC remote terminals 715, 725, 735 capable of packetizing local loop signals via voice packet processors 716, 726 and 736 and forwarding the packets to the respective packet nodes 701, 702, 703. The packets streams are forwarded by the high-speed network 700 to other packet nodes 704, 705, 706 that provide access to local services and may be located anywhere convenient for the ILEC. Packet node 704 provides access to telephony services, for example through a gateway 741 to a legacy Class 5 switch 742 to the ILEC's switched voice network 740, as further described above. As telephony is migrated to so-called "soft switches" 745 in network 748, the packet streams can be forwarded by packet node 704 to such soft switches directly. Packet node 705 can forward other packet streams to the ILEC's data network 750. Packet node 706 can act as a point-of-interface node for CLECs seeking unbundled access to the local loops of subscribers. The packet streams of those subscribers can be forwarded by the high-speed network 700 to packet node 706 and forwarded to CLECs, either CLEC network 761 or 762 in FIG. 7.

Just as the packet network 700 can readily be adapted to next-generation local service applications by the ILEC and the CLECs, so too high-capacity subscribers can avoid copper loops altogether and build out their infrastructure to interface directly to the network 700 using their own packet-based interfaces. Accordingly, the, different above local access architecture embodiments can serve as a suitable platform for upgrading the copper plant to more advanced packet-based access loops.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to certain packet technologies such as ATM. However, the principles of the present invention could be readily extended to other packet formats and protocols. Such an extension could be readily implemented by one of ordinary skill in the art given the above disclosure.

The invention claimed is:

1. A digital loop transmission system, comprising:
   a remote terminal comprising a processor that converts an analog signal carried on a customer loop into digital packets; and
   a packet node connected to the remote terminal having a forwarding table associating each one of a plurality of subscribers with one of a plurality of different local exchange carriers, wherein the packet node is configured to selectively forward the digital packets based on an identifier in the digital packets, wherein the identifier identifies one of said plurality of subscribers associated with the digital packets, to equipment of a respective one of the plurality of different local exchange carriers in accordance with the forwarding table, wherein each one of the plurality of different local exchange carriers provides a different service subscribed to by one of the plurality of subscribers.

2. The digital loop transmission system of claim 1, further comprising a gateway which converts the digital packets into a format compatible with a central office switch.

3. The digital loop transmission system of claim 2, wherein the packet node is reconfigured to forward the digital packets of a particular customer loop to the equipment of a different one of the plurality of different local exchange carriers.

4. The digital loop transmission system of claim 3, wherein the analog signal is a telephony signal.

5. The digital loop transmission system of claim 1, wherein the identifier is a virtual circuit identifier and each of the digital packets is an asynchronous transfer mode cell.

6. The digital loop transmission system of claim 1, wherein the identifier is a label and each of the digital packets is a multiprotocol label switching packet.

7. A method of operating a digital loop transmission system, comprising:
   converting an analog signal carried on a customer loop into digital packets and including in the digital packets an identifier associated with the customer loop;
   retrieving an association between the identifier and one of a plurality of different local exchange carriers from a forwarding table stored in a packet node, wherein the forwarding table associates each one of a plurality of subscribers with one of the plurality of different local exchange carriers; and
   selectively forwarding the digital packets to equipment of a respective one of the plurality of different local exchange carriers in accordance with the forwarding table based on the identifier included in the digital packets, wherein the identifier identifies one of the plurality of subscribers associated with the digital packets, wherein each one of the plurality of different local exchange carriers provides a different service subscribed to by one of the plurality of subscribers.

8. The method of claim 7, wherein the digital packets are converted at a gateway by the respective one local exchange carrier into a format compatible with a central office switch.

9. The method of claim 8, wherein the association is changed when the customer loop is subscribed to a different local exchange carrier of the plurality of different local exchange carriers.

10. The method of claim 9, wherein the association between the identifier and the respective one of the plurality of local exchange carriers identifies an interface connected to the equipment of the respective one of the plurality of different local exchange carriers and the digital packets are forwarded to the interface identified in the association.

11. The method of claim 10, wherein the analog signal is a telephony signal.

12. The method of claim 11, wherein the identifier represents a packet flow of the customer loop.

13. The method of claim 12, wherein the identifier is a virtual circuit identifier and each of the digital packets is an asynchronous transfer mode cell.

14. The method of claim 12, wherein the identifier is a label and each of the digital packets is a multiprotocol label switching packet.

15. A digital loop transmission system, comprising:
   means for converting an analog signal carried on a customer loop into digital packets and including in the digital packets an identifier associated with the customer loop;
   means for retrieving an association between the identifier and one of a plurality of different local exchange carriers from a forwarding table stored in a packet node, wherein the forwarding table associates each one of a plurality of subscribers with one of the plurality of different local exchange carriers; and
   means for selectively forwarding the digital packets to equipment of a respective one of the plurality of different local exchange carriers in accordance with the forwarding table based on the identifier included in the digital packets, wherein the identifier identifies one of the plurality of subscribers associated with the digital packets, wherein each one of the plurality of different local exchange carriers provides a different service subscribed to by one of the plurality of subscribers.

16. The digital loop transmission system of claim 15, wherein the digital packets are converted at a gateway by the respective one of the plurality of local exchange carriers into a format compatible with a central office switch.

17. The digital loop transmission system of claim 16, wherein the association is changed when the customer loop is subscribed to a different local exchange carrier of the plurality of different local exchange carriers.

18. The digital loop transmission system of claim 17, wherein the association between the identifier and the respective one of the plurality of local exchange carriers identifies an interface connected to the equipment of the respective one of the plurality of different local exchange carriers and the digital packets are forwarded to the interface identified in the association.

19. The digital loop transmission system of claim 18, wherein the analog signal is a telephony signal.

20. The digital loop transmission system of claim 19, wherein the identifier represents a packet flow of the customer loop.

* * * * *